M. MATHY.
PRODUCTION OF BOTTLES AND OTHER VESSELS AND APPARATUS THEREFOR.
APPLICATION FILED JUNE 26, 1919.
1,425,124.
Patented Aug. 8, 1922.
2 SHEETS—SHEET 1.
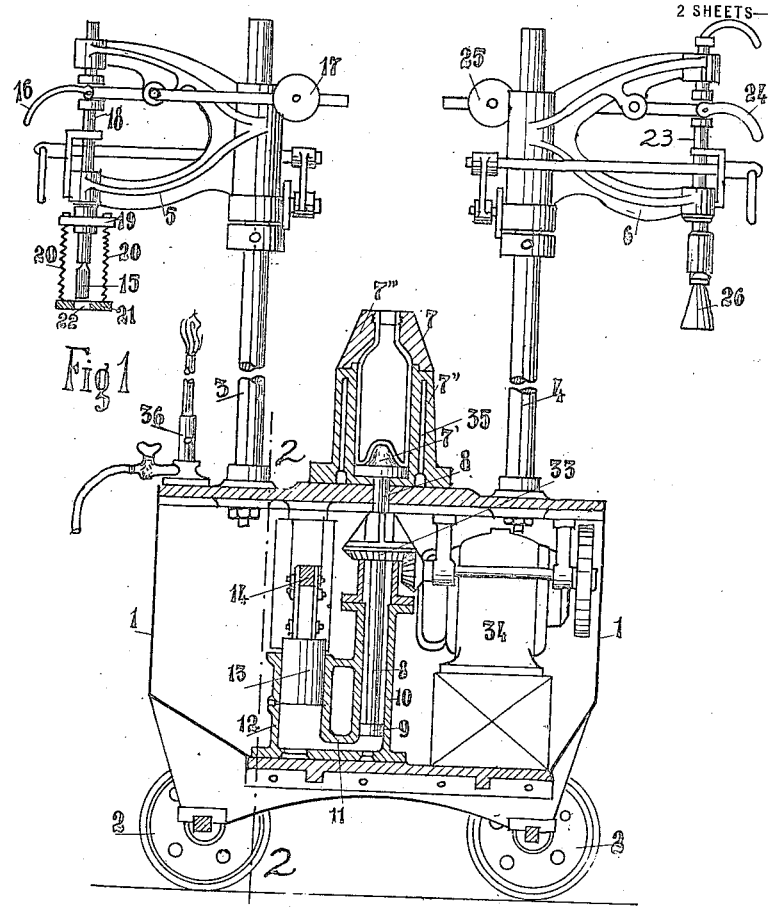
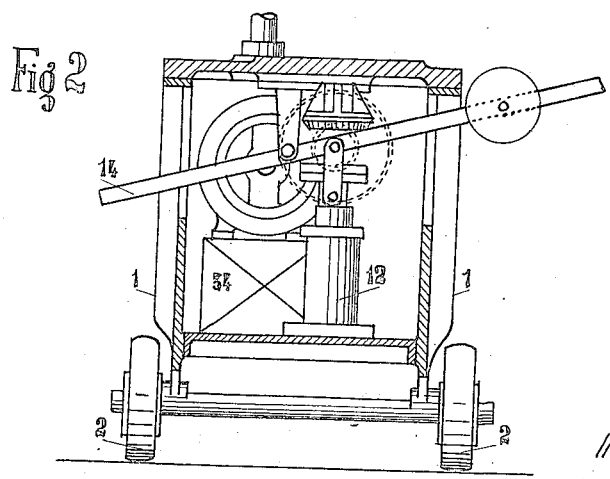
INVENTOR.
Maurice Mathy.
By Lawrence Langner
Attorney.

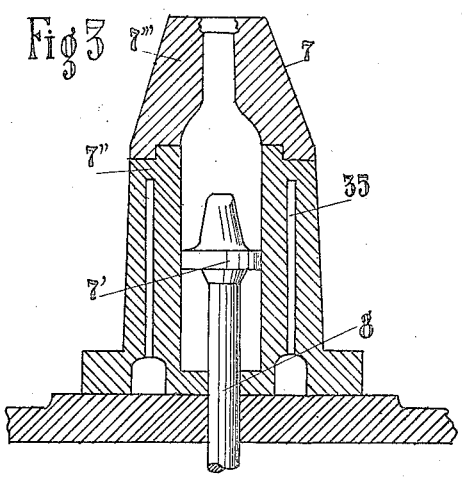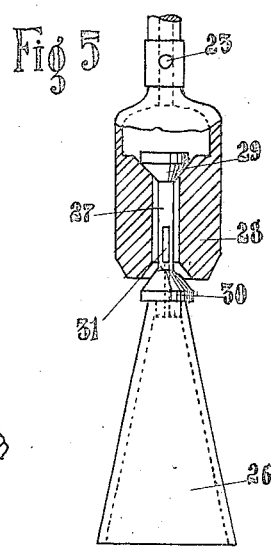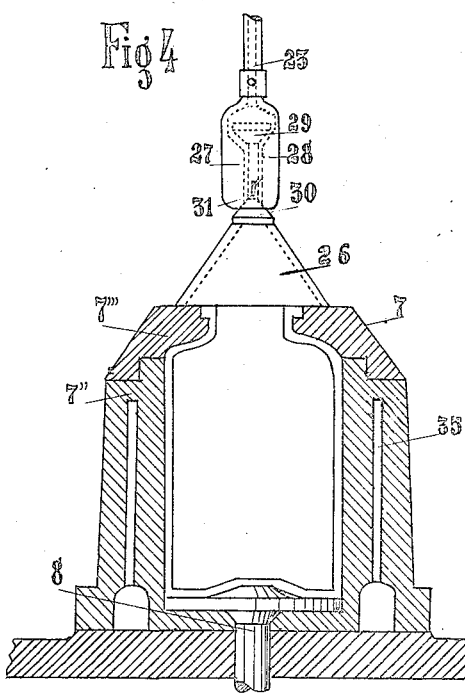

UNITED STATES PATENT OFFICE.

MAURICE MATHY, OF LIEGE, BELGIUM.

PRODUCTION OF BOTTLES OR OTHER VESSELS AND APPARATUS THEREFOR.

1,425,124.     Specification of Letters Patent.     Patented Aug. 8, 1922.

Application filed June 26, 1919. Serial No. 307,027.

*To all whom it may concern:*

Be it known that I, MAURICE MATHY, manufacturer, a subject of the King of Belgium, and resident of Liege, in the Kingdom of Belgium, have invented certain new and useful Improvements in or Relating to the Production of Bottles or Other Vessels and Apparatus Therefor; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

The present invention relates to a machine for manufacturing bottles or other vessels by blowing, this machine being essentially differentiated from known machines of the kind by the fact that the bottom of the mould rises inside the body of the mould in such a way as to raise the upper level of the blank to the upper level of the bottle or other vessel to be obtained. When the blank occupies this position a tool carried by a bracket is inserted into the blank so as to form the hole for the upper part of the neck. This tool is withdrawn and then swung away from the mould by rotating the bracket that carries it, after which a compressed-air supply device terminating in a suitable nozzle and carried by another bracket, is brought over the mould and enables the blowing to be effected. The apparatus is completed by the provision of means enabling the bottle or other vessel to be rotated inside the mould.

This machine, which is of particularly simple and strong construction, enables a large output of a product of good quality to be obtained. The absence of any joint in the body of the mould permits bottles or other vessels to be formed without ribs and consequently of great strength.

The drawings accompanying this specification illustrate by way of example one constructional form of the invention.

In these drawings:

Figure 1 is a sectional elevation of the apparatus showing the tool for forming the upper part of the neck of the bottle and the means for supplying compressed air to the mould brought into a plane parallel to the plane of the drawing.

Figure 2 is a cross section on the line 2—2 in Fig. 1.

Figure 3 shows, on a larger scale, the operation of forming the upper part of the neck in the case of a bottle.

Figure 4 shows, on the same scale as Figure 3, the operation of blowing a carboy.

Figure 5 shows, on a different scale, the nozzle of the blowing pipe, when it is not applied to the mould.

The frame 1 of the machine, carried by wheels 2, is provided with two shafts 3 and 4 serving to support the brackets 5 and 6. The radii of the arcs traversed by the brackets are such that each of the devices described above may be brought over the axis of the mould 7.

In line with the axis of this mould 7 is arranged a vertical rod 8 forming an extension of a small piston 9, which is displaceable in a cylinder 10 filled with oil and communicating with a cylinder 12 in which there moves a large piston 13 which can be worked by hand by means of the lever 14.

The mould 7 consists of three parts, viz—

(1) the bottom 7' carried by the rod 8;

(2) the body 7'' consisting of a hollow vertical cylinder;

(3) and a displaceable top or neck part 7''' hollowed internally and shaped according to the external shape of the neck of the bottle.

The tool that serves to form the necks consists of a punch 15, which is worked by a lever 16 and which a balance weight 17 tends to raise. On to the rod 18, to which is fixed this punch 15, is fixed a cross bar 19 traversed by two rods 20 carrying a plate 21 pierced with a hole 22. Springs tend to move the plate 21 away from the cross bar 19. This punch 15 is kept hot by the flame of a lamp 36.

The compressed-air supply pipe 23 is supported by the bracket 6 pivoted on the shaft 4. It is displaceable vertically and can be lowered by means of a lever 24 provided with a balance weight 25 tending to raise it. It terminates at the bottom in a nozzle constituted as follows, (see Figures 4 and 5): The terminal nozzle 26 is fixed to a tube 27 which is movable in a socket 28 fixed to the extremity of the tube 23. This pipe 27 is provided with two valves 29 and 30 the apices of which are directed one towards the other. It is closed at the top but is pierced with holes between the two valves. When the terminal nozzle 26 is not pressed against a support, that is to say, when it is hanging freely, (see Figure 5), the upper valve 29 rests against its seat and keeps the compressed-air passage closed. When on the contrary the nozzle 26 is raised in consequence of it coming into contact with an immovable object, such as a mould, it is displaced with respect to the socket 28 in such a way that the valve 29 leaves its seat and the valve 30 is pressed on to its own seat in such a way as to close the bottom of the passage 31 in which the tube 27 moves. The compressed air passing under the valve 29 then traverses this passage 31, enters the tube 27 through the holes therein, flows through said tube and finally reaches the terminal nozzle 26.

The apparatus operates in the following manner:

The mold being mounted as shown in Figures 1, 3 and 4, the blank is inserted therein, and then, by acting on the lever 14 the bottom 7' is raised until the blank is flush with the top of the neck. The lever 16 is then operated so as to apply the plate 21 against the upper face of the part 7''', of the mould. By continuing to operate the lever 16 the punch 15 is made to penetrate through the hole 22 in the plate 21 into the mouth of the bottle. During this movement the springs 20 are compressed and press the plate 21 energetically against the part 7''' of the mould so as to form a tight joint. When the mouth is formed in this way, the lever 16 is let go and under the action of the balance weight 17 it rises, thereby raising the punch 15. The bracket 5 is then moved away and the bracket 6 is rotated in such a way as to bring the nozzle 26 over the axis of the mould. By operating the lever 24 the nozzle 26 carried by the pipe 23 is pressed against the part 7''' of the mould, the continued descent of the pipe 23 bringing about the supply of air through the said nozzle as explained above. This air, by entering the mouth, effects the blowing of the bottle. During the blowing the bottom 7' of the mould is lowered.

If it is desired to rotate the article that is being blown in the mould, the bottom 7' of the mould is provided with projections entering a little way into the bottom of the bottle, and this bottom 7' is rotated through the medium of a pinion 33 driven from an electric motor 34 arranged in the frame of the machine.

This pinion 33 has a key-and-groove connection with shaft 8, so that not only is the pinion enabled to rotate said shaft, but said pinion and shaft are rendered capable of relative axial displacement, such displacement allowing the bottom 7' to rise.

It is to be observed that the part 7'' of the mould can be cooled by the circulation of air through the annular space 35. The cooling so produced tempers the glass.

What I claim is:

1. A machine for the mechanical manufacture of bottles or other vessels, comprising a frame, a mould fixed on said frame, means for raising the blank inside the mould until it is flush with the upper part of the neck, a pair of movable brackets mounted on the aforesaid frame, a tool supported by one bracket for making a hole in the blank, and means supported by the other bracket for supplying compressed air in the hole of the blank, said brackets being arranged to permit said tool and said air-supplying means to be brought one after the other over the mould.

2. A machine for the mechanical manufacture of bottles or other vessels, comprising a frame, a mould fixed on said frame, means for raising the blank inside the mould until it is flush with the upper part of the neck, a pair of movable brackets mounted on the aforesaid frame, a tool supported by one bracket for making a hole in the blank, a compressed air supply pipe supported by the other bracket and terminating in a socket provided with a passage, a tube terminating in a nozzle and moving in said passage, and valves arranged on said tube for closing said passage when the nozzle hangs freely and for supplying the pipe with air when said tube is raised within the socket, said brackets being arranged to permit said tool and said air supplying pipe and its associated tube to be brought one after the other over the mould.

In testimony whereof I affix my signature in presence of two witnesses.

MAURICE MATHY.

Witnesses:
LEONARD LEVER,
GEORGES VANDER HAEGHEN.